United States Patent [19]
Burkert et al.

[11] 3,857,435
[45] Dec. 31, 1974

[54] PROCESS FOR MAKING SOLUBLE CORES

[75] Inventors: Edward F. Burkert, Garfield Heights; Paul A. Guinn, Brecksville, both of Ohio

[73] Assignee: The Freeman Supply Company, Toledo, Ohio

[22] Filed: Nov. 1, 1973

[21] Appl. No.: 411,897

Related U.S. Application Data

[63] Continuation-in-part of Ser. No. 245,302, April 19, 1972, abandoned.

[52] U.S. Cl. .................................... 164/36, 164/45
[51] Int. Cl. ........................... B22c 9/04, B22c 7/02
[58] Field of Search ............ 164/23, 24, 25, 26, 34, 164/35, 36, 245, 246

[56] References Cited
UNITED STATES PATENTS

| | | | |
|---|---|---|---|
| 3,085,895 | 4/1963 | Gutman | 164/45 X |
| 3,186,041 | 6/1965 | Horton | 164/25 |
| 3,339,620 | 9/1967 | Krzyzanowski et al. | 164/45 X |
| 3,570,585 | 3/1971 | Harris | 164/45 X |
| 3,639,507 | 2/1972 | Uram | 164/246 X |
| 3,678,987 | 7/1972 | Kydd | 164/45 |

*Primary Examiner*—Andrew R. Juhasz
*Assistant Examiner*—John E. Roethel

[57] ABSTRACT

The improved process of making investment castings using a water decomposable core material that includes a nitrogen containing organo-ring material from the group consisting of: mono and fused 5 and/or 6 membered ring compounds having as a ring constituent at least one nitrogen atom per every two rings of the compound, water soluble substitution products of said compounds, polymers of said compounds, and polymers of said substitution products of said compounds. Preferred materials comprise a mixture of these materials with polyethylene glycol and effervescent agents.

17 Claims, No Drawings

PROCESS FOR MAKING SOLUBLE CORES

This application is a continuation-in-part application of our copending U.S. Pat. application Ser. No. 245,302, filed Apr. 19, 1972, now abandoned.

BACKGROUND OF THE INVENTION

Complicated castings having openings with undercut portions can be accurately and conveniently made using investment casting procedures. In such procedures a pattern of the desired shape is made from heat removable materials, as for example waxes, and a slurry of refractory materials is invested around the pattern to produce a mold of the desired shape. Thereafter the removable materials are burned or melted out of the mold and the cavity so formed is filled with a molten metal of the desired composition.

Castings having undercut openings therein are formed from patterns made of two different materials. Such patterns are made by initially producing a partial pattern corresponding in shape to the undercut opening and which is made from a material which can be decomposed away with water or an aqueous solution. The partial pattern which corresponds in shape to the undercut opening of the object to be produced is called a core, and cores which can be decomposed with an aqueous solution are generally called soluble cores. After the soluble core is molded and solidified, the core is put into a mold having a cavity conforming in shape to the exterior configuration of the part to be produced, and a heat decomposable material such as a pattern wax is flowed into the mold and solidified around the soluble core. Thereafter the composite pattern is placed in an aqueous solution which decomposes the soluble core material to leave a pattern having an opening therein of the desired re-entry shape. In those cases where the pattern is of a large size, a pouring cup of the heat decomposable material is added to the pattern which is then ready for the coating with the ceramic materials to produce the mold. In those cases where the pattern if of a small size, a number of the patterns are connected together with runners and a pouring cup which are made from the heat decomposable pattern material to produce a cluster or tree. The cluster is then coated with the ceramic mold-producing material to produce a multiple cavity mold.

The ceramic mold is produced by dipping the pattern or cluster, as the case may be, in a slurry of ceramic material followed by stuccoing with fine ceramic sand. The coating is hardened and the process repeated a number of times to produce a ceramic coating of desired thickness. In some instances, the pattern with the ceramic coating is placed in an open ended flask, and the space between the flask and the pattern is filled with a slurry of ceramic backup material which is then hardened to produce the green mold. In other instances, the ceramic may need no backup material, and in these instances the ceramic coating is the mold. Such molds are called monolithic ceramic shell molds. Regardless of whether the mold is a solid mold, or is a monolithic shell mold, it is then placed in a high temperature furnace or steam autoclave to cure the ceramic materials and remove the heat decomposable material. This leaves the mold with a cavity therein having the desired shape of finished part. The cavity of the mold is then filled with a metal of desired composition, the metal is solidified, and the mold broken apart to free the desired cast objects.

The most commonly used prior art composition for making soluble cores is a mixture of polyethylene glycol and powdered sodium bicarbonate. Polyethylene glycol is a waxy material which can be melted and molded and is also sufficiently soluble in aqueous solutions that it can be dissolved away from or out of the pattern waxes which form the bulk of the pattern. The sodium bicarbonate is, of course, an effervescent agent which liberates carbon dioxide when it is contacted by aqueous acid solution, and the liberation of carbon dioxide not only helps to break up the soluble core material, but induces circulation of the aqueous solution over the surface of the soluble core material.

The prior art soluble core materials which are made from polyethylene glycol have a deficiency in that they must be heated to a temperature above 125°F before being injected into the dies which form the soluble core. During solidification of these materials to room temperature a crazing or cracking of the surface of the soluble cores takes place. This crazing and cracking is accompanied by a considerable amount of shrinkage which cannot always be compensated for by an increase in size of the die cavity. These prior art materials have a narrow plastic range and therefore the materials must be substantially a liquid during injection into the die. Because of the crazing problem, the dies must be warm, and consequently a considerable time elapses in solidification of the molten material in the dies and a low core production rate results.

An object of the present invention is the provision of a new and improved water decomposable core material which has a broad plastic range and does not craze and crack during solidification from the liquid or plastic condition, so that less cooling of the material is required in the dies, and a higher core production rate is achieved than with prior art materials.

Another object of the invention is the provision of a new and improved core material of the above-described type which can be used in conjunction with and/or a plasticizer for the higher molecular weight polyethylene glycols which are a solid at room temperature.

Another object of the invention is the provision of a new and improved core material of the above-described type which can be extruded to provide cores of uniform cross section.

Other objects and advantages of the invention will become apparent to those skilled in the art from the following description of the preferred embodiments.

DESCRIPTION OF THE PREFERRED EMBODIMENTS

According to the invention, it has been discovered that nitrogen containing 5 and 6 membered organo-ring compounds, and fused 5 and/or 6 membered organo-ring compounds having as a ring constituent at least one nitrogen atom for every two rings of the compound along with their water soluble substitution products, their polymers, and polymers of the water soluble substitution products, have very desirable properties for producing soluble cores. Not only are these materials water soluble, but they have very desirable solidification characteristics which make possible a considerable increase in core strength over prior art cores and an increase in the rate of production of soluble cores.

These materials have greatly diminished crazing and cracking tendencies during solidification, and have a low coefficient of shrinkage during solidification. In addition, these materials are plasticizers for polyethylene glycol, and improve the properties of soluble cores made from mixtures of polyethylene glycol and the above mentioned compounds. It appears that the 5 and 6 membered rings, and the fused 5 and/or 6 membered ring compounds disperse themselves as "plates" between the long chain molecules of the polyethylene glycol to decrease the hydrogen bonding that otherwise exists between the polyethylene glycol molecules. The oxygen ether linkages in the polyethylene glycol molecules are polar, and provide strong hydrogen bonds with the hydrocarbon groups of other polyethylene molecules. The 5 and 6 membered ring compounds described above are compatible with polyethylene glycol; and when readily mixed therewith, the rings enter between the polyethylene glycol chains and produce a separation thereof. The mixture therefore has considerably weaker hydrogen bonds, so that less shrinkage, cracking and crazing is encountered during the transition from the liquid to the solid state.

The nitrogen atoms in these ring compounds are strong water solubilizing groups, and only one nitrogen in one of two fused rings is necessary to make the compound water soluble. When nitrogen exists in each of the fused rings of the compound, the material is very soluble, and when two nitrogen groups exist in each ring, the material is even more soluble in water. These rings may also contain oxygen either in the ring, or as a substitution group. By way of example, the oxygen may be an ether linkage in the ring, or a substitution group, an alcohol substitution group, or an ester substitution group. The melting points of the compounds will generally increase as the number of fused rings is increased and the fused rings may be desired in that they provide greater separation of the polyethylene glycol chains. Compounds having 4 or more fused rings containing at least one nitrogen per every two rings will in general be acceptable, and the preferred materials will average at least one nitrogen per ring. Some examples of the 5 and 6 membered ring compounds which can be used will include pyrrolidone, hydantoin, purine, pyocyanine, pyrazine, pyrazole, pyrazoline, pyrazolone, pyridazine, pyridine, pyrimidine, pyrrole, pyrrolidine, pyrroline, quinazoline, quinoline, quinoxaline, quinuclidine and substitution products of the above materials. The substitution groups can themselves be water soluble groups, as for example aldehyde, alcohol, ester, ether, hydroxyl, amine, or nitrate groups, etc. or can be lower alkyl or alkene groups. In the case of the alkene groups, these materials, and particularly vinyl groups, can be used to provide polymerization functionality for increasing the molecular weight of the ring compounds. Other lower alkene groups will include propylene groups and butylene groups, as for example.

Very desirable water decomposable core materials can be made using the above materials as plasticizers for polyethylene glycols. Such materials may comprise the following formulations:

| Materials | % By Weight |
| --- | --- |
| polyethylene glycol | 20–70% |
| plasticizer described above | 5–35% |
| solid effervescent agent | 5–60% |

The polyethylene glycols may be of any molecular weight that gives a desired melting temperature, and will generally be a mixture having molecular weights of from 200 to 20,000 with a preferred average weight of approximately 4,000. The effervescent agent may be any material which liberates a gas when contacted by aqueous solution. Sodium bicarbonate is a very desirable effervescent agent in that it is relatively inexpensive and liberates carbon dioxide as an innocuous gas. The plasticizer can be any compound falling within the above definition.

As above described, the prior art soluble core materials have had such strong deficiencies that it has not been practicable to produce billets or to use the prior art core materials in plastic injection molding machines of the billet injection type. In this type of plastic injection machinery, a solid cylinder of the plastic to be injected, commonly called a "billet," is heated to a temperature wherein the material is in a flowable plastic state but is nevertheless handleable as a billet. The plastic billets are heated to a uniform temperature at which the material is plastic and infinitely flowable under pressure, but still sufficiently solid to be handleable. The billet so heated is placed into the end of the cylinder of the injection machinery and the piston is inserted into the cylinder on top of the heated billet. The piston forces the plastic billet material into the cavity of matched dies, that are at a lower temperature than the billet material, and after a short dwell period, the material in the cavity of the dies becomes solidifed to a degree that the core can be removed therefrom. The soluble core materials of the present invention are so free of crazing and cracking and have such a pronounced plastic range (100° to 150°F) that they can be used in billet type plastic injection machinery and be forced into matched metal dies that are chilled to room temperature or below. Under such conditions the injected materials are cooled more quickly than are the prior art liquid materials when injected into heated dies as is required to prevent crazing and cracking. In addition, the billet temperature can be lower than the temperature required to make prior art materials liquidus, so that a far greater production rate can be had with the materials of the present invention than can be had with the prior art materials.

In general, billet injection can be accomplished with materials having generally the following composition:

| Materials | % By Weight |
| --- | --- |
| polyethylene glycol | 20–70% |
| plasticizer described above | 5–35% |
| solid effervescent agent | 5–60% |

EXAMPLE 1

A soluble core material is made from the following percentage by weight of materials:

| Materials | % By Weight |
| --- | --- |
| polyethylene glycol (50/50 mixture 2,000 to 6,000 m.w.) | 55% |
| vinylpyrrolidone-vinyl | 10% |

-Continued

| Materials | % By Weight |
|---|---|
| acetate copolymer (60:40 weight ratio) | |
| sodium bicarbonate (325 mesh) | 35% |

The materials were melted together and intimately mixed. The material is solidifed into a billet that is approximately 2 inches in diameter and 10 inches long. The billet is heat soaked in an oven to achieve a uniform temperature of 115°F, and is then put into the pressure cylinder of a billet type plastic injection machine and is forced into the cavity of matched metal dies having a cavity shaped to provide a soluble core. The soluble core is then suitably supported in the chamber of another set of matched metal dies, and the space between the soluble core material and the matched metal dies is filled with a pattern wax to surround the soluble core with solidified pattern wax of a shape corresponding to that of the desired product. Thereafter the wax pattern is immersed in a bath of water that is acidified to a Ph of 2 with hydrochloric acid, and all portions of the water decomposable core are completely removed.

The water decomposable cores can be produced by the billet injection machine at a rate that is at least twice that achieved when the prior art soluble core materials comprising polyethylene glycol and sodium bicarbonate are injected into dies as a molten material. In addition, the soluble cores formed by billet injection had no detectable crazing or cracking in the surface, and had less shrinkage, distortion and more strength than do cores made with the prior art materials.

EXAMPLE 2

A soluble core material was made from the same materials given in Example 1 excepting that 70 parts of polyethylene glycol (could be from 20 to 70 parts), 25 parts of vinylpyrrolidone-vinyl acetate copolymer (could be from 5 to 35 parts), and 5 parts of sodium bicarbonate (could be from 5 to 60 parts) were used. This material was heated until it was in a liquid state having a temperature of approximately 125°F (could be 125°F to 150°F) and was injected into dies in the liquid state. Cores so made had substantially no crazing or cracking, but the production rate of the cores is less than that of Example 1 above, because of the larger dwell time of the material in the dies.

EXAMPLE 3

A soluble core material is made from the following materials in percent by weight:

| Materials | % By Weight |
|---|---|
| polyethylene glycol (4,000 m.w. ave.) | 50% |
| monomethylol dimethyl hydantoin | 15% |
| sodium bicarbonate (325 mesh) | 35% |

Billets of the material were made using the same procedure as given in Example 1 above, and soluble cores having the same general properties as those of Example 1 were obtained.

EXAMPLE 4

The process of Example 3 is repeated excepting that dimethyl hydantoin formaldehyde resin was used for the monomethylol dimethyl hydantoin, and cores having the same general properties were produced.

The word "polymer" is used in this specification in its broadest sense and will cover polymerized products of the compounds themselves as homopolymers or heteropolymers with one or more different monomers. The vinylpyrrolidone used in Example 1 can be made by reacting acetylene with pyrrolidone to give the vinylpyrrolidone. As previously explained, any polymers can be used so long as they are water decomposable, but the preferred materials will be polymers wherein the groups which connect the rings of the compound are soluble monomers or polymers. One type of preferred materials are water soluble vinyl acetate copolymers since these materials are not only water soluble, but the acetate radicals are highly compatible with polyethylene glycol molecules. Other water soluble materials which can be used as a linking material are polyvinyl alcohol, vinyl chloride, vinylidene chloride, and other unsaturated non-water soluble monomers including the lower alkenes having two to four carbon atoms. Ring compounds containing amine hydrogen may be polymerized into long chain thermoplastic molecules using any lower aldehyde having up to 6 carbon atoms per molecule, epichlorohydrin, an acid anhydride, a dicarboxylic acid, etc.. Polymerization can also be achieved by converting the hydrogen of an amine to a methylol group with formaldehyde followed by condensation with a polyglycol. The above types of polymers are given by way of example only, and it will be understood that any polymerization reaction which will join the 5 and 6 membered organo-ring compounds by water soluble chains or hydrocarbons of no more than 4 carbon atoms can be used.

EXAMPLE 5

A 3-inch diameter billet 12 inches long was made of the following materials using the procedure of Example 1:

| Materials | % By Weight |
|---|---|
| Polyethylene glycol (1,540 m.w.) | 35% |
| Polyethylene glycol (20,000 m.w.) | 5% |
| Vinylpyrrolidone-vinyl acetate copolymer (60:40 weight ratio) | 10% |
| Sodium bicarbonate (325 mesh) | 50% |

A billet of the above material was placed in a billet type plastic injection machine at room temperature and extruded through an extrusion die that was also at room temperature to produce a hollow 1 inch diameter rod having a half inch diameter hole therein. The water decomposable core so produced was extruded at the rate of approximately 1 foot per second. This core had excellent surface finish and its diameter did not vary by more than 0.002 inch.

While the invention has been described in considerable detail, we do not wish to be limited to the particular embodiments shown and described, and it is our intention to cover hereby all novel adaptations, modifica-

We claim:

1. In the process of producing investment castings wherein a pattern that is removable by heating is coated with a refractory forming material, the material is hardened, the pattern is removed to leave a void, and molten metal is put into the void to form a casting, the improvement comprising:
   a. forming at least a portion of the pattern from a water decomposable form that contains an organo-ring material from the group consisting of: 5 and 6 membered nitrogen containing organo-ring compounds, fused 5 and/or 6 membered organo-ring compounds having as a ring constituent at least one nitrogen atom per every two rings of the compound, water soluble substitution products of said compounds, polymers of said compounds, and polymers of said substitution products of said compounds;
   b. and washing the decomposable form away with an aqueous liquid before coating the remaining pattern with the refractory forming material.

2. The process of claim 1 wherein said portion of said pattern is a mixture of polyethylene glycol and said nitrogen containing organo-ring compound.

3. The process of claim 2 wherein said nitrogen containing organo-ring material is a polymer of an alkene substitution product of said 5 or 6 membered ring compound.

4. The process of claim 3 wherein said polymer is a copolymer of an ester of a lower alkene.

5. The process of claim 3 wherein said polymer is a copolymer of vinyl acetate.

6. The process of claim 5 wherein said polymer is a vinylpyrrolidone-vinyl acetate copolymer.

7. The process of claim 2 wherein said nitrogen containing organo-ring material is an aldehyde condensate.

8. The process of claim 7 wherein said ring material is hydantoin.

9. The process of claim 8 wherein said condensate is an aldehyde condensate of hydantoin.

10. The process of claim 2 wherein said nitrogen containing organo-ring material is a polymer of epichlorhydrin.

11. The process of claim 3 wherein said polymer is a copolymer of polyvinyl alcohol.

12. In the process of producing investment castings wherein a pattern is coated with a refractory forming material, the material is hardened, the pattern is removed to leave a void, and molten metal is put into the void to form a casting, the improvement comprising:
   a. forming a billet of the following materials in the following approximate percentages by weight:

| | |
|---|---|
| polyethylene glycol | 20–70% |
| effervescent filler | 5–60% |
| a plasticizer for the polyethylene glycol from the group consisting of mono and fused 5 and/or 6 membered ring compound having as a ring constituent at least one nitrogen atom per every two rings of the compound, water soluble substitution products of said compounds, polymers of said compounds, and polymers of said substitution products of said compounds, | 5–35% | b. heating the billet to a temperature between approximately 100° and 150°F,
   c. placing the heated billet in the pressure cylinder of a billet injecting machine,
   d. squeezing the heated billet material at said temperature between 100° and 150°F into an injection mold cavity to form a soluble core of the billet material,
   e. forming a composite of the soluble core and other nonsoluble material,
   f. dissolving the soluble core from the composite to leave a pattern, and
   g. coating the pattern with a refractory forming material.

13. The process of claim 12 wherein said plasticizer is a polymer of an alkene substitution product of one of said 5 and/or 6 membered ring compounds.

14. The process of claim 13 wherein said plasticizer is a copolymer of vinyl acetate.

15. The process of claim 14 wherein said plasticizer is a vinylpyrrolidone-vinyl acetate copolymer.

16. The process of claim 12 wherein said plasticizer is an aldehyde condensate of the ring compound.

17. The process of claim 16 wherein said plasticizer is an aldehyde condensate of hydantoin.

* * * * *